US009247842B2

(12) United States Patent
Cheung et al.

(10) Patent No.: US 9,247,842 B2
(45) Date of Patent: Feb. 2, 2016

(54) FOOD STEAMER

(75) Inventors: Shu Sang Cheung, Guangdong Province (CN); To Yin Pang, Guangdon Province (CN)

(73) Assignee: Huiyang Allan Plastic & Electric Industries Co., Ltd., Guangdong Province (CN)

( * ) Notice: Subject to any disclaimer, the term of this patent is extended or adjusted under 35 U.S.C. 154(b) by 680 days.

(21) Appl. No.: 13/492,938

(22) Filed: Jun. 11, 2012

(65) Prior Publication Data

US 2013/0126514 A1 May 23, 2013

(30) Foreign Application Priority Data

Nov. 21, 2011 (CN) ...................... 2011 2 0462597 U

(51) Int. Cl.
*A21B 1/00* (2006.01)
*A47J 27/04* (2006.01)

(52) U.S. Cl.
CPC ....................................... *A47J 27/04* (2013.01)

(58) Field of Classification Search
CPC ...................................................... A47J 27/04
USPC ......... 219/401, 386, 400, 441, 442, 385, 521; 126/369, 20, 20.2, 369.1, 369.3, 348; 99/417, 340, 400, 401, 444–446, 467, 99/468, 469, 473, 474, 476, 480, 483, 516, 99/536

See application file for complete search history.

(56) References Cited

U.S. PATENT DOCUMENTS

| 4,655,192 | A | * | 4/1987 | Jovanovic | 126/20 |
| 5,515,773 | A | * | 5/1996 | Bullard | 99/330 |
| 5,865,104 | A | * | 2/1999 | Sham et al. | 99/417 |
| 2006/0283332 | A1 | * | 12/2006 | Garman | 99/279 |
| 2006/0289439 | A1 | * | 12/2006 | Dreimann et al. | 219/401 |
| 2011/0266272 | A1 | * | 11/2011 | Colburn et al. | 219/401 |

* cited by examiner

*Primary Examiner* — Phuong Nguyen

(57) ABSTRACT

A food steamer is described hereinafter. The food steamer includes a base unit, a steam basket supported on the base unit, a heating device configured in the base unit for converting water into steam, a water tank configured for supplying water for the heating device, a drip tray configured for collecting water drops from the steam basket, and an electronic controller configured for control the heating device. The heating device includes at least a steam outlet for jetting steam to the steaming basket. The water tank is detachably sited on the base unit and beside the steam basket. This food steamer can reserve much more water, extend the cooking time and shorten the time of steam generation, convenient and safe operation.

5 Claims, 6 Drawing Sheets

FOOD STEAMER

BACKGROUND OF THE INVENTION

The present disclosure relates to improvement of a food steamer.

A currently available food steamer includes a base, a water tank, a heater, drip tray, one to three steam baskets. The water tank is fixed on the base. The heater has a shape of cap or plate, which is mounted in the centre of water tank. The drip tray is fitted on the water tank. The steam basket is set on the drip tray. A heater-cover is fitted and surround the cap or plate of the heater. When the water is filled in the water tank, the water go through from a hole of the heater-cover to the heater cap or plate. When the heater cap or plate is heated, the water become boiling and steam is generated. The steam rise and go into the steam basket for food cooking.

This food steamer has the disadvantage: the water tank is fixed on the base and limited by the size of the unit, it cannot be reserved much water for longer cooking food, so it needs to refill water in the midway during the cooking process and very inconvenient. The water tank is not detachable and the user only can fill the water or empty the water tank with the base together. Also it is very difficult to clean the water tank, during the water tank cleaning, the water may go easily to the inside of the base and may cause electrical danger. If the water tank capacity is increased the whole unit would become larger and higher, affecting the look and use friendliness, the cost may also be increased.

During the cooking procedure, the user needs to fill the water in to the heater cap or plate which surround with the heater-cover, then the heater heat up the water temperature to reach the boiling point to provide the steam, and some heat may transfer through the heater cover to the outside water, so the heater needs long time to product the steam for cooking. As the heater can not convert the water into the steam at once, the user can not cook the food immediately, it would affect the food taste and quality, it would also reduce the nutrition of the food due to the prolonged cooking process.

The heater cap or plate is exposed on the base, the user can be easy to touch the heater cap or plate that may burn the hand of user, and thus it is unsafe.

This invention concerns a food steamer which provides a large storage capacity of water that allows long time steam cooking, the heater device is mounted in the base and much faster and high efficiency of steam generation and heating, easy to use and safer operation.

BRIEF SUMMARY OF THE INVENTION

It is therefore an object of the invention to provide a food steamer with detachable water tank which can store large capacity of water to facilitate long time steam cooking. The food steamer a base unit, a steam basket supported on the base unit, a heating device configured in the base unit for converting water into steam, a water tank configured for supplying water for the heating device, a drip tray configured for collecting water drops from the steam basket, and an electronic controller configured for control the heating device. The heating device includes at least a steam outlet for jetting steam to the steaming basket. The water tank is detachably sited on the base unit and beside the steam basket.

It is therefore another object of the invention to provide this detachable water tank mounted on one side of the base unit, the size of the water tank is not limited by the size of unit base, the unit can be designed in lower profile.

It is therefore another object of the invention to provide this detachable water tank is mounted on one side of the base, during refilling, emptying or cleaning the water tank independently and without the base.

It is therefore another object of the invention to provide a food steamer with the heater device which is mounted in the base and is not exposed outside of the unit.

It is therefore another object of the invention to provide a heater which is connected to the an electrical pump by a plastic pipe, the electrical pump is connected to the water tank by plastic tube, when the water is pumped to the heater with a suitable flow rate, the suitable quantity of water is heated up directly by the heating device and converted into steam at once.

It is therefore another object of the invention to provide the height level of the water tank outlet position is not restricted to a level above the heater position level, the electrical pump delivers the water into the heating heater. This allows a higher degree of freedom in the overall product design.

It is therefore further object of the invention to provide the steams which jet through to one or more steam outlets, the steam outlets are fixed on the base and covered with a diffuser which mount on the drip tray, then the steam jet to the steam basket to cook the food.

Accordingly, the heater is mounted inside the base, the water flow rate is adjusted by the electrical pump and generating suitable amount of steam with minimum power; the heating device reduces the heat lose and energy wasting, this heating system has high energy-efficient and can produce a high steam rate, and cook the food faster.

Advantageously, this invention depicts a new design that provides faster steam and higher steam rate, it has benefits of higher quality cooking, and better taste, and reducing the nutrition loss.

DETAILED DESCRIPTION OF THE INVENTION

Figure 1:
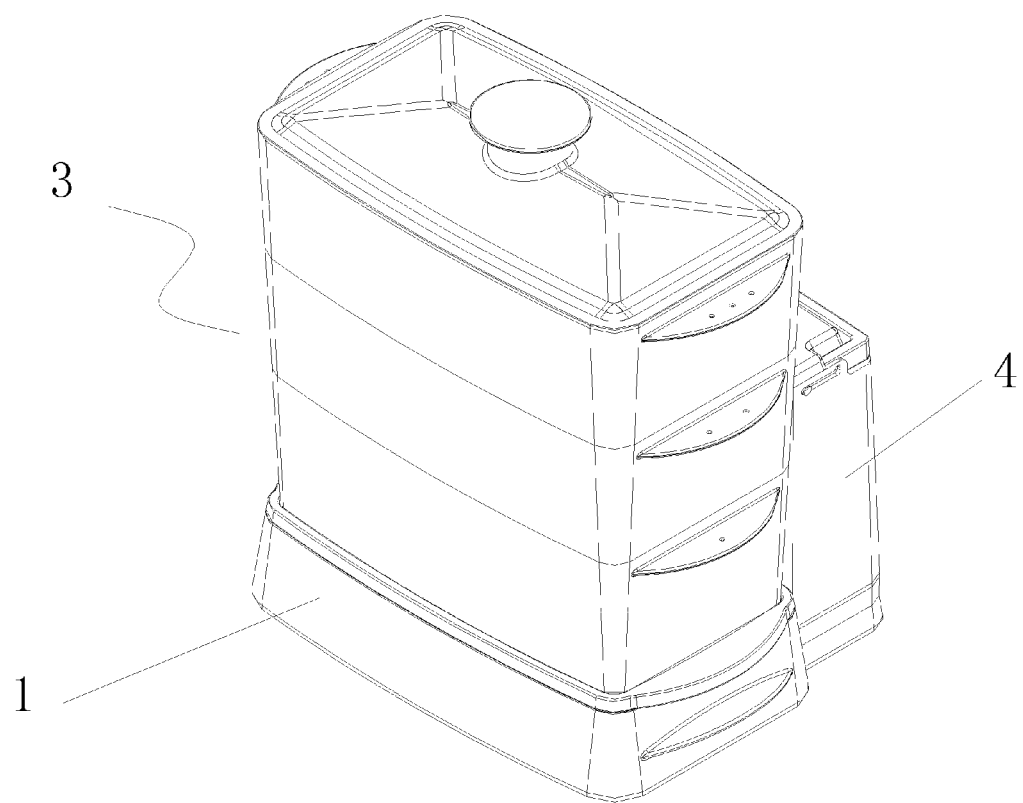
FIG. 1 is a schematic illustration of a food steamer in accordance with an exemplary embodiment of the invention.
Figure 2:
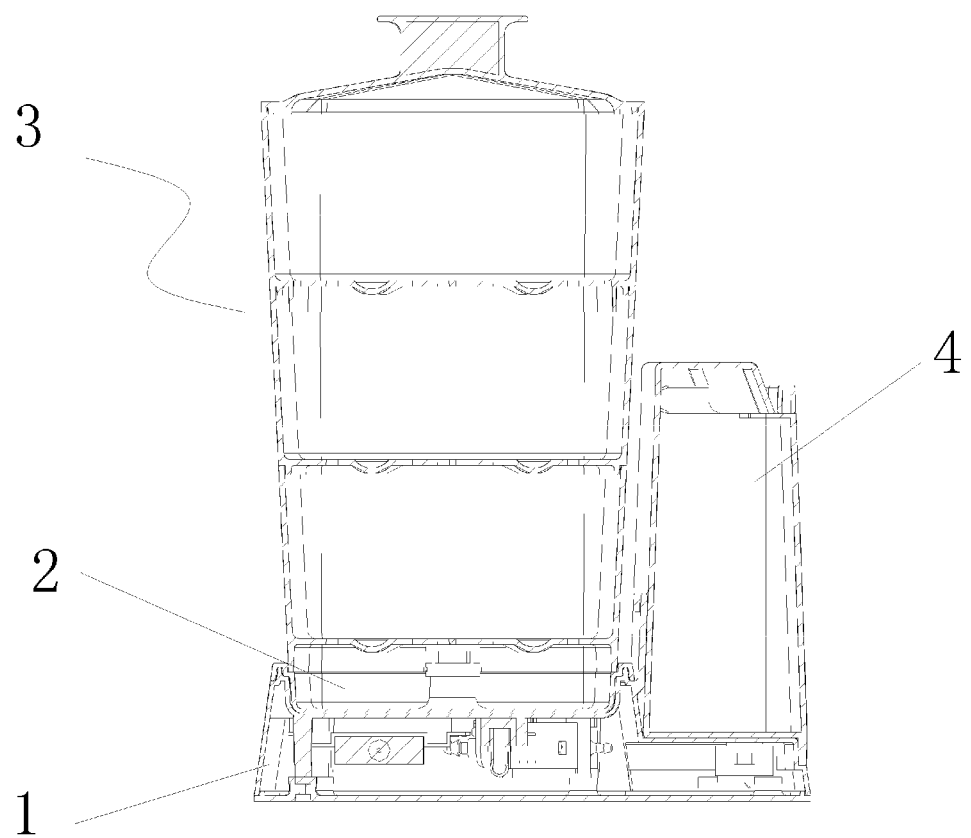
FIG. 2 is a sectional view through the main component of the food steamer.
Figure 3:
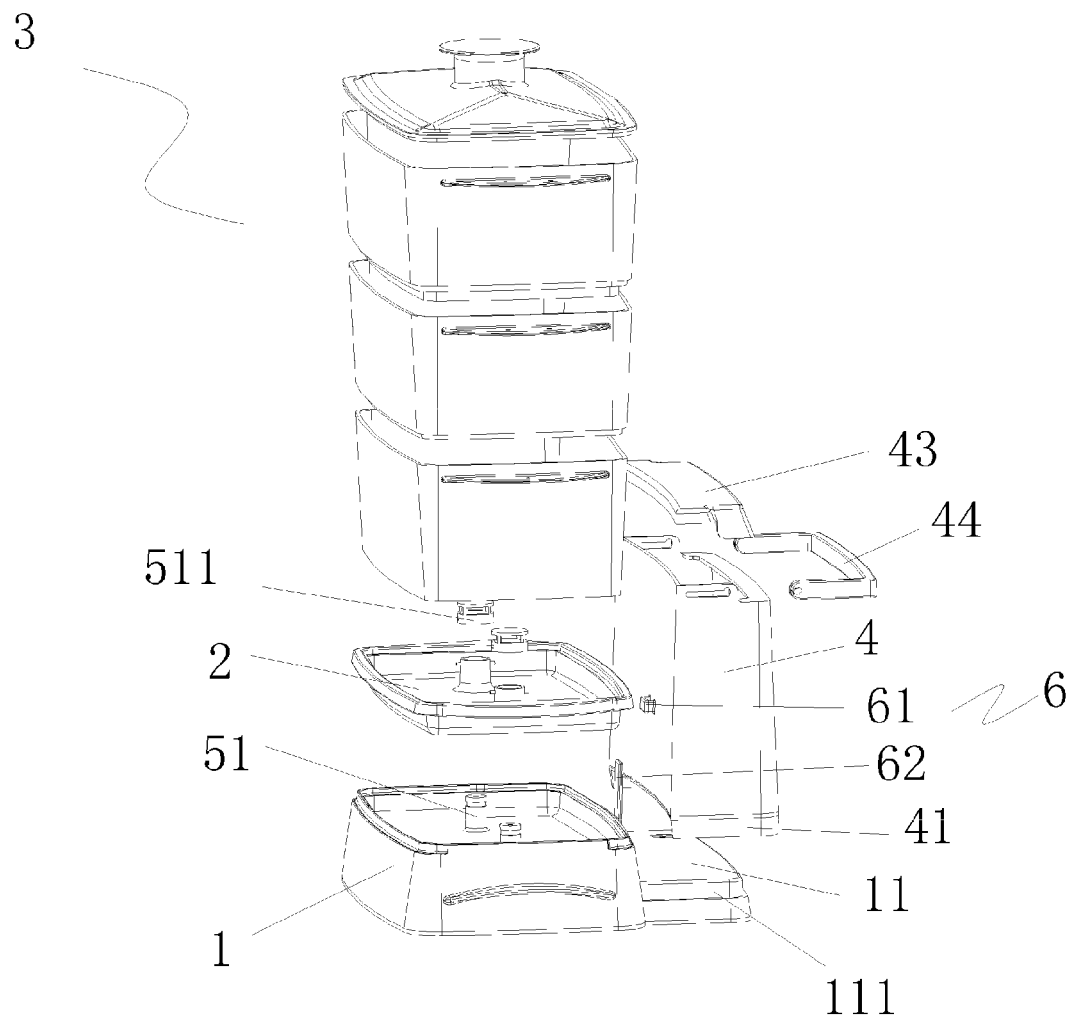
FIG. 3 is an exploded view of the main component of the food steamer.
Figure 4:
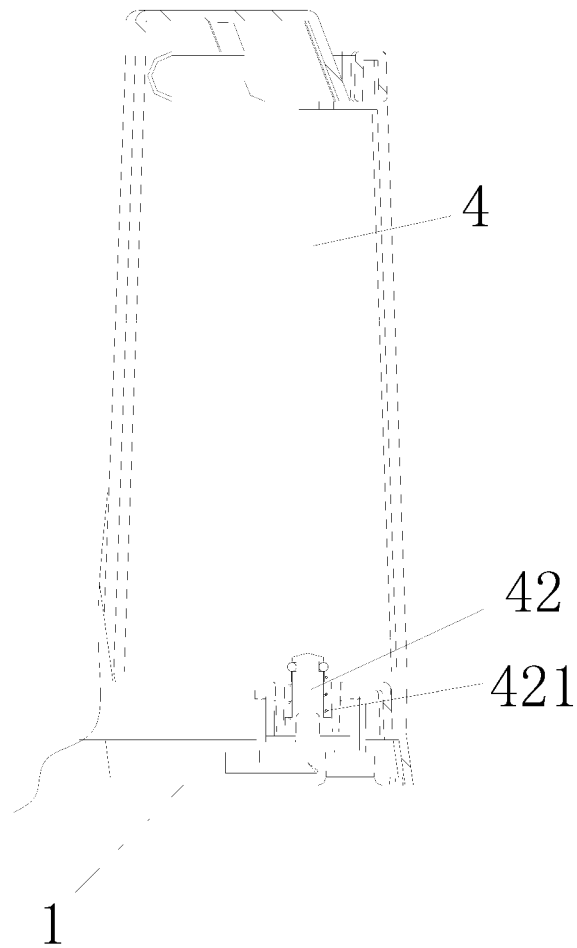
FIG. 4 is a schematic view showing the base unit connects to the water tank.
Figure 5:
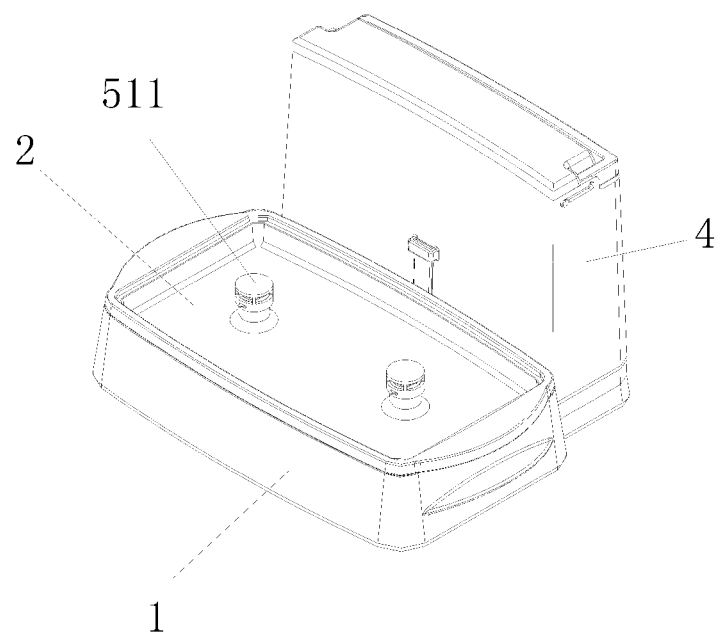
FIG. 5 is a schematic view of the drip tray of FIG. 3.
Figure 6:
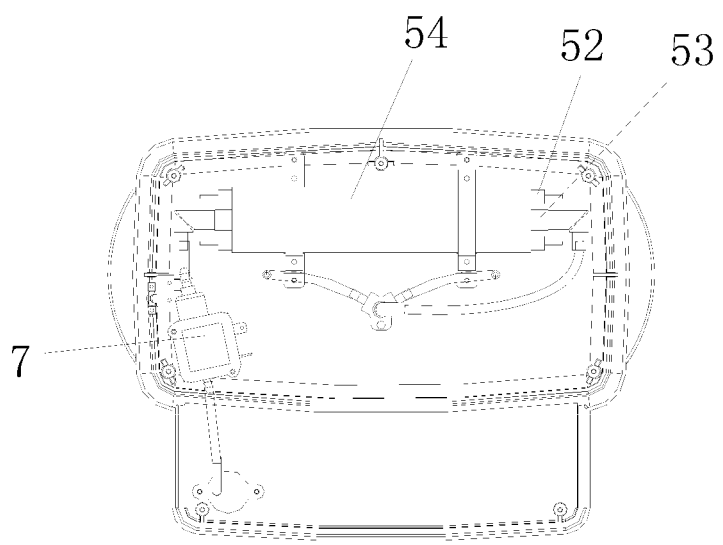
FIG. 6 is a perspective view of a base unit according to a preferred embodiment of the invention.

Embodiments of the present disclosure will now be described in detail below, with reference to the accompanying drawings.

Referring to FIGS. 1-7, a food steamer includes a base unit 1, a drip tray 2, a steam basket 3 and a water tank 4. The drip tray 2, the steam basket 3 and the water tank 4 are provided at an upper portion of the base unit 1. The base unit 1 includes a heating device 5 for converting water into steam. An electronic controller is configured to control the whole operation system. The heating device 5 connects with one or more steam outlets 51 for jetting steam to the steaming basket 3. The water tank 4 connects to the heating device 5 through a plastic pipe. The water tank 4 is mounted on one side of the base unit 1, is fitted to on a step surface 11 of the base unit 1, and is a detachable part.

In this embodiment, an outlet is fitted at the bottom of the water tank 4. The outlet order through a valve 41, an electrical pump 7, and the heating device 5, and then connects to the steam outlets 51 by the plastic pipes. The inlet of the electrical pump 7 connects to the outlet of the valve 41 through the plastic pipe. The pipe projects out from the base unit 1. The outlet of the electrical pump 7 connects to the inlet of the heating device 5 through another plastic pipe to supply the cold water to the heating device 5. During operating process, firstly, fill the water tank 4 with water and steadily place the water tank 4 on the base unit 1 The water tank 4 is removable so that it can be filled independently. The water tank 4 is designed to hold sufficient volume of water to provide steam for at least one cooking operation, and no need to be refilled. Then the electronic control system controls the operation of the heating device 5 and the electrical pump 7, such that the electrical pump 7 transfers a suitable quantity of water from the water tank 4 to the heating device 5, and the heating device 5 generates the water into the steam. The steam goes to the steam outlet 51 and through to the drip tray 2. The drip tray 2 has one or more diffuser 511 which covers the steam outlets 51. Each diffuser 511 defines some holes which arrange evenly at the side and divide the steam evenly jetting out to the steam basket 3. The steaming basket 3 includes one or a plurality of trays, the trays being arranged to allow the free passage for the steam. In this embodiment, there are two steam outlets 51, the number of the steam outlet is depend on the steam rate output and cooking different amount of the food.

The valve 41 is fitted in the water outlet in the bottom of the water tank 4. The valve is a check valve and has a spring 42. When the water tank 4 is put on the base unit 1, then the pipe connecting the water tank 4 and the valve 7 open and the water can pass through to the pump 7. When the water tank is removed from the base unit 1, the valve 42 is closed by the spring 42 and stops the water drop down through the water outlet.

Figure 7:
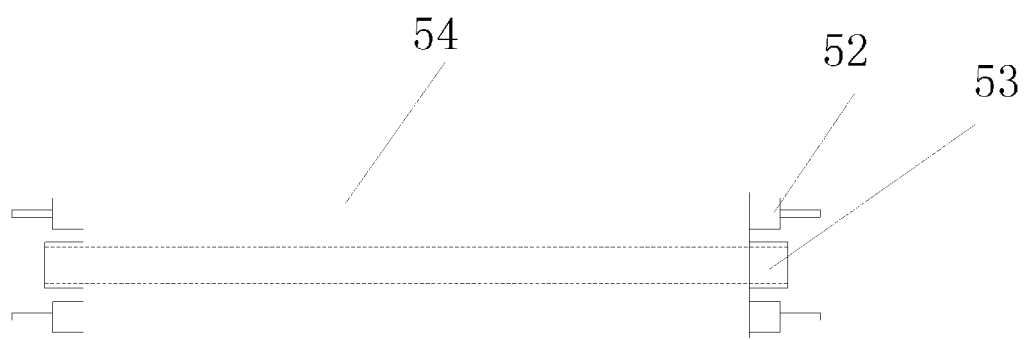
FIG. 7 is a schematic view of a heating device according to one example embodiment of the invention.

To improve the efficiency of steam generation, the heating device 5 adopted in this embodiment is an instant steam generator, this portion without preheating time, when the water is pumped to the heating device 5 with a suitable flow rate, the suitable quantity water is heated up directly by the heating device 5 and become steam at once, it's convenient to supply steam to all the steaming basket 3, enabling steam in each tray evenly distributed, and more efficient cooking to keep better taste and nutrition of food. Specifically described, the heating device 5 includes electrical heating tubes 52 and a heating exchange pipe 53 which are mounted inside with a casing 54, the inlet of the heating exchange pipe 53 connects to the outlet of the pump 7, the outlet of the heating exchange pipe 53 connects to the steam outlets 51, for example as shown in FIG. 7. The top of each steam outlet 51 is covered with the diffuser 511 that prevents any risk of burning for the user by the jetting steam.

A transparent window is provided on the water tank 4 or the water tank 4 is made of transparent material so as to easy to observe the inside water level. A lid 43 is positioned at the top of the water tank 4 for refilling water conveniently. Moreover, in order to convenient to lift, the water tank 4 further includes a handle 44.

In this implementation, the stepped surface 11 is positioned parallel to or below the heating device level surface, that is, the height level of the water tank 4 outlet position is not restricted to the heating device 5 higher position level. Because of the pump 7, there is no need to make higher level deliver water into the heating device 5, the design overcomes the localization of the traditional design. To avoid over-heating and consequent possible safety concerns, the heating device 5 is provided with a temperature sensor for connecting to the electronic controller by signal. The electronic controller will control the heating device 5 to be switched OFF when the temperature of the heating device is above a preset value.

Advantageously, in some implementation, the flow, duration time and frequency of the steam can be controlled according to different requirements of different type food. Experiments show that steam-jetting periodically from steam outlets 51 perform better than continuously jetting, so the electronic controller controls the heating device 5 and the pump 7 working periodically. For instance, steam jetting for 10 seconds, and then pause for 5 seconds, cooking with such steam supply at intervals is more energy efficient. When a large quantity of food to be steamed and constant steam supply is needed, the heating device 5 and the pump 7 can work without intervals, in a continuous manner.

The above statement represents a typical operation of the invention, the utility model should not be limited within the scope of the above detailed statement only. It will be appreciated that various modifications may be made to the embodiments described above. For example, the fastener structure may be replaced by other structure that realize the similar or the same function. To the person skilled in the art, other changes and modifications which are based on this invention could be made, such as to change the shape or the material of the water tank, the steam cooker may be provided with any number of the steam outlets and arrangement could be configured under their requirement. The idea of this new utility model and the above stated possibilities shall all be protected under this patent application. This utility patent should cover the scope of protection as stated in the application claims.

What is claimed is:
1. A food steamer, comprising:
a base unit;
a steam basket supported on the base unit;
a heating device configured in the base unit for converting water into steam, the heating device comprising at least a steam outlet for jetting steam to the steaming basket;
a water tank configured for supplying water for the heating device;
an electrical pump mounted in the base unit, with an inlet of which connecting to an outlet of the water tank through a pipe project out from the base unit, and with an outlet of which connecting to the inlet of the heating device;
a drip tray configured for collecting water drops from the steam basket; and
an electronic controller configured for controlling the heating device-and the electrical pump to generate steam periodically or continuously according to user's set;
wherein the water tank is detachably sited on the base unit and beside the steam basket, the outlet of the water tank is set with a check valve, the pipe opens the valve when the water tank is placed on the base unit and the pipe inserts the valve;
where the drip tray is fixed on the base unit, above the heating device and below the steam basket; the drip tray comprises one or more diffusers which cover corresponding steam outlets of the heating device, a cap of each diffuser defines some holes arranged evenly at the side and divide the steam evenly jetting out to the steam baskets;
wherein the water tank is made by transparent material;

wherein a transparent window is set on the water tank so as to observe the liquid level;

wherein the heating device comprises an electrical heating tube and a heating exchange pipe which both are mounted inside a casing, the inlet of the heating exchange pipe connects to the outlet of the pump, the outlet of the heating exchange pipe connects to the steam outlets.

2. The food steamer of claim 1, wherein the base unit defines a stepped surface arranged to fit the water tank, the stepped surface is lower or parallel to a level surface of the heating device.

3. The food steamer of claim 1, wherein a spring is sleeved on the valve for preventing water-drop from the outlet of the water tank when the water tank is removed from the base unit.

4. The food steamer of claim 1, wherein the steam basket comprises at least one tray, each tray is arranged to allow the free passage of steam.

5. The food steamer of claim 1, wherein the top of the water tank comprises a lid and a handle.

\* \* \* \* \*